(12) United States Patent
Sakata

(10) Patent No.: US 12,051,288 B2
(45) Date of Patent: Jul. 30, 2024

(54) FAULT SIGN DETECTION DEVICE, FAULT SIGN DETECTION SYSTEM, FAULT SIGN METHOD, AND FAULT SIGN DETECTION PROGRAM

(71) Applicant: NEC Corporation, Tokyo (JP)

(72) Inventor: Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 253 days.

(21) Appl. No.: 17/781,614

(22) PCT Filed: Oct. 7, 2020

(86) PCT No.: PCT/JP2020/037953
§ 371 (c)(1),
(2) Date: Jun. 1, 2022

(87) PCT Pub. No.: WO2021/111728
PCT Pub. Date: Jun. 10, 2021

(65) Prior Publication Data
US 2023/0005308 A1 Jan. 5, 2023

(30) Foreign Application Priority Data
Dec. 5, 2019 (JP) ................................. 2019-220334

(51) Int. Cl.
*G07C 5/08* (2006.01)
*G07C 5/00* (2006.01)

(52) U.S. Cl.
CPC ........... *G07C 5/0825* (2013.01); *G07C 5/008* (2013.01)

(58) Field of Classification Search
CPC .... G07C 5/0825; G07C 5/008; G07C 5/0808; B60R 16/02; G01M 17/007
See application file for complete search history.

(56) References Cited

U.S. PATENT DOCUMENTS

2004/0263180 A1* 12/2004 Rogers ............... G05B 23/0235
324/522
2012/0046856 A1* 2/2012 Doi ...................... G05D 1/0891
701/124
(Continued)

FOREIGN PATENT DOCUMENTS

JP 2003-182475 A 7/2003
JP 2006-053016 A 2/2006
(Continued)

OTHER PUBLICATIONS

International Search Report for PCT Application No. PCT/JP2020/037953, mailed on Dec. 22, 2020.
(Continued)

*Primary Examiner* — Behrang Badii
(74) *Attorney, Agent, or Firm* — Sughrue Mion, PLLC

(57) ABSTRACT

An input unit 81 receives input of a normal pattern file including information indicating a normal condition of a vehicle, and a fault pattern file including information indicating a sign that a vehicle fault is about to occur. A collection unit 82 collects observation data observed by each device in the target vehicle. A comparison unit 83 compares the content of the normal pattern file with the content of the observation data. when the difference between the content of the normal pattern file and the content of the observation data is greater than a predetermined first threshold value, the comparison unit 83 further compares the content of the fault pattern file and the observation data, and when the difference between the content of the fault pattern file and the observation data is within a predetermined second threshold value, determines that there is the sign of the fault in the target vehicle.

10 Claims, 6 Drawing Sheets

(56) References Cited

U.S. PATENT DOCUMENTS

2017/0030274 A1* 2/2017 Nakanishi ................. F01P 7/16
2021/0191393 A1* 6/2021 Zhu ........................ G07C 5/02

FOREIGN PATENT DOCUMENTS

| JP | 2011-203116 A | 10/2011 |
| JP | 2014-148294 A | 8/2014 |
| JP | 2015-158421 A | 9/2015 |
| JP | 2015-176285 A | 10/2015 |
| JP | 2016-215787 A | 12/2016 |

OTHER PUBLICATIONS

Dongjin Song, Ning Xia, Wei Cheng, Haifeng Chen, Dacheng Tao, "Deep r-th Root of Rank Supervised Joint BinaryEmbedding for Multivariate Time Series Retrieval", KDD 2018, Proceedings of the 24th ACM SIGKDD InternationalConference on Knowledge Discovery & Data Mining, pp. 2229-2238, Aug. 19-23, 2018, London, UK.

* cited by examiner

FAULT SIGN DETECTION DEVICE, FAULT SIGN DETECTION SYSTEM, FAULT SIGN METHOD, AND FAULT SIGN DETECTION PROGRAM

This application is a National Stage Entry of PCT/JP2020/037953 filed on Oct. 7, 2020, which claims priority from Japanese Patent Application 2019-220334 filed on Dec. 5, 2019, the contents of all of which are incorporated herein by reference, in their entirety.

Technical Field

The present invention relates to a fault sign detection device, a fault sign detection system, a fault sign detection method and a fault sign detection program for detecting a sign of a fault occurring in a vehicle.

Background Art

Currently, general vehicles are equipped with a system to grasp the content of faults that have occurred. Specifically, when a fault occurs in a vehicle, a DTC (Diagnostic Trouble Code) is output, and by reading the output DTC, it is possible to investigate the factors (fault location and fault content) that caused the fault of the vehicle.

On the other hand, it is preferable to detect a sign of fault in advance and repair it before the vehicle breaks down, instead of responding after the vehicle breaks down. In this regard, for example, Patent literature 1 describes a vehicle fault diagnosis device that predicts when a vehicle will break down. The device described in the patent literature 1 maintains a fault pattern that represents the process until vehicle control system faults in time series, and predicts the fault timing of the vehicle control system by comparing the fault pattern with the history of learning values actually used in the vehicle control system of the vehicle in the past.

Patent literature 2 also describes a device for estimating a fault condition of a tire using a pressure fluctuation spectrum. The device described in the patent literature 2 detects the pressure fluctuation level of the pressure fluctuation spectrum according to the tire condition and estimates that there is some abnormality in the tire by comparing it with the pressure fluctuation level of a normal tire.

Non-patent literature 1 describes a method for extracting features from time series data.

Citation List

Patent Literature

PTL 1: Japanese Patent Laid-Open No. 2006-53016
PTL 2: Japanese Patent Laid-Open No. 2003-182475

Non-Patent Literature

NPL 1: Dongjin Song, Ning Xia, Wei Cheng, Haifeng Chen, Dacheng Tao, "Deep r-th Root Rank Supervised Joint Binary Embedding for Multivariate Time Series Retrieval", KDD '18 Proceedings of the 24th ACM SIGKDD International Conference on Knowledge Discovery & Data Mining, pp. 2229-2238, August, 2018.

Summary of Invention

Summary of Invention

Technical Problem

Noise and odor in a vehicle that can be sensed by humans can be considered a sign of a fault. Therefore, it is possible to detect signs of some kind of fault by installing sensors in vehicles that can detect such unusual noises and odors. However, not all vehicles are necessarily equipped with sensors to detect such events in general, and it is not realistic to install all the sensors that are assumed to detect faults in a vehicle. Therefore, it is preferable to be able to detect a sign of a fault of a vehicle without installing special sensors.

The vehicle fault diagnostic device described in the patent literature 1 generates a fault pattern based on the relationship with the elapsed years and predicts faults based on the fault pattern. However, even if the device described in the patent literature 1 can predict faults due to age-related deterioration, etc., it cannot detect the signs of faults that may occur in daily life.

The device described in the patent literature 2 estimates whether the tire is faulty or not by comparing the pressure fluctuation level of a normal tire with the pressure fluctuation level detected during driving to. However, a pressure fluctuation level that deviates from the normal condition is not necessarily an indication of a fault. For example, as described in the patent literature 2, since many patterns can be assumed as road surface conditions, the detected pressure fluctuation level may be greatly affected by the road surface conditions. In such cases, even if the condition is not a fault, detection of a level that deviates even slightly from the normal condition may result in frequent false detections.

Therefore, it is an exemplary object of the present invention is to provide a fault sign detection device, a fault sign detection system, a fault sign detection method and a fault sign detection program that can improve the accuracy of detecting a sign of a vehicle fault.

Solution to Problem

The fault sign detection device according to the exemplary aspect of the present invention is a fault sign detection device for detecting a sign of a fault of a target vehicle, includes an input unit for receiving input of a normal pattern file including information indicating a normal condition of a vehicle, and a fault pattern file including information indicating a sign that a vehicle fault is about to occur, a collection unit for collecting observation data observed by each device in the target vehicle, and a comparison unit for comparing the content of the normal pattern file with the content of the observation data, wherein when the difference between the content of the normal pattern file and the content of the observation data is greater than a predetermined first threshold value, the comparison unit further compares the content of the fault pattern file and the observation data, and when the difference between the content of the fault pattern file and the observation data is within a predetermined second threshold value, determines that there is the sign of the fault in the target vehicle.

The fault sign detection system according to the exemplary aspect of the present invention includes the above-mentioned fault sign detection device, and a server which generates a normal pattern file and a fault pattern file, wherein the server includes an observation data input unit for receiving input of observation data, a generation unit for extracting time series features of the observation data and generating the normal pattern file and the fault pattern file based on the extracted feature, and a transmitting unit for transmitting the generated normal pattern file and fault pattern file to the fault sign detection device.

The fault sign detection method according to the exemplary aspect of the present invention is a fault sign detection method for detecting a sign of a fault of a target vehicle, includes receiving input of a normal pattern file including information indicating a normal condition of a vehicle, and a fault pattern file including information indicating a sign that a vehicle fault is about to occur, collecting observation data observed by each device in the target vehicle, comparing the content of the normal pattern file with the content of the observation data, when the difference between the content of the normal pattern file and the content of the observation data is greater than a predetermined first threshold value, comparing the content of the fault pattern file and the observation data, and when the difference between the content of the fault pattern file and the observation data is within a predetermined second threshold value, determining that there is the sign of the fault in the target vehicle.

The fault sign detection program according to the exemplary aspect of the present invention is a fault sign detection program is installed in a computer for detecting a sign of a fault of a target vehicle, causes the computer to execute, an input process of receiving input of a normal pattern file including information indicating a normal condition of a vehicle, and a fault pattern file including information indicating a sign that a vehicle fault is about to occur, a collection process of collecting observation data observed by each device in the target vehicle, and a comparison process of comparing the content of the normal pattern file with the content of the observation data, wherein when the difference between the content of the normal pattern file and the content of the observation data is greater than a predetermined first threshold value, further comparing the content of the fault pattern file and the observation data, and when the difference between the content of the fault pattern file and the observation data is within a predetermined second threshold value, determining that there is the sign of the fault in the target vehicle, in the comparison process.

Advantageous Effects of Invention

According to the exemplary aspect of the present invention, it is possible to improve the accuracy of detecting a sign of a vehicle fault.

DESCRIPTION OF EMBODIMENTS

Hereinafter, exemplary embodiments of the present invention are described with reference to the drawings.

Exemplary Embodiment 1

Figure 1:
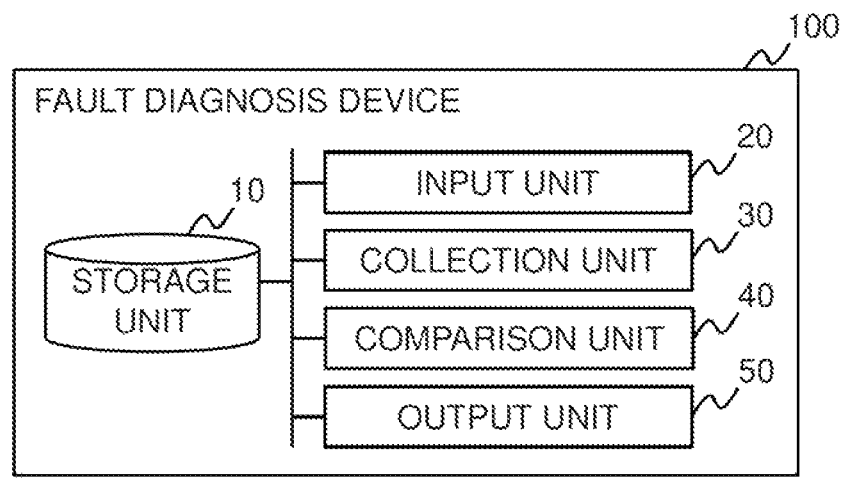
FIG. 1 It depicts a block diagram showing a configuration example of an exemplary embodiment of a fault sign detection device according to the exemplary aspect of the present invention.

FIG. 1 is a block diagram showing a configuration example of an exemplary embodiment of a fault sign detection device according to the exemplary aspect of the present invention. The fault sign detection device 100 of this exemplary embodiment is a device for detecting a sign of a fault of a target vehicle, and is installed in the target vehicle. The fault sign detection device 100 comprises a storage unit 10, an input unit 20, a collection unit 30, a comparison unit 40, and an output unit 50.

The storage unit 10 stores various information necessary for the fault sign detection device 100 to perform a process. The storage unit 10 may also store a pattern file received by the input unit 20 described below. The content of the pattern file will be described later. The storage unit 10 is realized by a magnetic disk or the like, for example.

The input unit 20 receives input of the pattern file for comparison by the comparison unit 40, described below, with data collected by the collection unit 30. The input unit 20 may, for example, receive the input of the pattern file manually, or may receive the input of the pattern file transmitted from another device (not shown in FIG. 1). The input unit 20 stores the received pattern file in the storage unit 10.

The collection unit 30 collects observation data observed by each device in the target vehicle for detecting a sign of a fault in time series. Examples of devices include an engine, a water temperature sensor, and a battery. In general, CAN (Controller Area Network) is often used as a communication protocol for electronic control units (ECUs) in in-vehicle networks. Therefore, the collection unit 30 may collect communication data specified by a CAN protocol as observation data. In addition, the collection unit 30 may also collect data obtained by OBD (On-board diagnostics) as observation data. Data obtained by OBD may include an engine RPM and speed, a battery status, and a water temperature, etc.

The form of the observation data to be collected is arbitrary, and the form of each data should be predetermined according to the information necessary for the comparison unit 40 described later to perform a process.

Here, a pattern file used in this exemplary embodiment will be described. In this exemplary embodiment, two types of pattern files are assumed. The first pattern file is a pattern file including information indicating a normal condition (normal condition) of the vehicle, and is a file indicating a condition in which the vehicle is not determined to indicate a sign of a fault. In the following description, the first pattern file is sometimes referred to as a normal pattern file.

The second pattern file is a pattern file including information indicating a sign that a vehicle fault is about to occur, and is a file indicating a condition in which a vehicle fault is expected to occur. In the following description, the second pattern file is sometimes referred to as a fault pattern file. Both the first pattern file and the second pattern file are files including information in a manner that can be compared with observation data observed in the vehicle.

That is, the normal pattern file holds information on one or more observation data observed at each device when the vehicle is in a normal condition, and the fault pattern file holds information on one or more observation data observed at each device when there are signs that a vehicle fault may occur. The contents of the normal pattern file and the fault pattern file are arbitrary. The normal pattern file may simply be a file that defines a range of observation data values that can be taken when the vehicle is in a normal condition.

Similarly, the fault pattern file may simply be a file that defines a range of observation data values indicating a sign of vehicle fault.

It is preferable to be able to determine the normal condition of the vehicle and the signs of vehicle fault with respect to the features indicated by the observation data, rather than simply comparing them to the values of the observation data. Therefore, features indicating normal condition extracted from time-series observation data may be included in the normal pattern file. The normal pattern file including such features can be referred to as a feature master indicating the normal condition. Similarly, features indicating a sign of a fault extracted from time-series observation data may be included in the fault pattern file. A fault pattern file including such features can be referred to as a feature master indicating a sign of a fault.

Hereinafter, a specific method for generating a feature master indicating a normal condition will be described. In the case of a vehicle, it is difficult to determine whether the vehicle is in a normal condition in general, and it is easily affected by the driving scene, such as the driving location, and the driving environment, such as the weather, making it difficult to obtained data that can be called normal.

Therefore, it is particularly preferable to use the observation data of a vehicle operating at a predetermined speed to generate the feature master, in consideration of the environmental conditions in which the observation data is to be obtained. As an example, observation data for a vehicle that is idling (i.e., driven at speed=0) may be used. This is because, if the vehicle is idling, the environmental changes of the vehicle due to driving are considered to be minimal, and thus the steady state of the vehicle during idling can be considered a normal condition.

As another form, it is preferable to use the observation data of the vehicle driving at speeds higher than a predetermined speed (for example, 80 km/h) on a highway to generate a feature master. When driving on a highway, the vehicle's environment changes to a small degree, but these changes are smaller than when driving on a regular road. Therefore, the condition indicated by the observation data obtained when driving on the highway can be considered a normal condition. The time series features of the observation data described above may be extracted as features indicating the normal condition, and a feature master indicating the normal condition of the vehicle may be generated based on the extracted features.

For example, when observation data of a vehicle operating at a speed of 0 is used, the time series features of the observation data may be extracted as features indicating the normal condition of the vehicle while idling. For example, when observation data of the vehicle driving at speeds higher than a predetermined speed on a highway is used, the time series features of the observation data may be extracted as features indicating the normal condition of the vehicle operating at the speed or higher.

The content of the feature master indicating the normal condition is arbitrary. Considering that the feature master is used for comparison with the observation data obtained by the vehicle, it is preferable to be able to extract features of the observation data in a compact form. Therefore, a partial time-series observation data may be generated by dividing the time-series observation data into multiple segments, and the features common to each segment may be extracted and a feature master including such features may be generated.

Next, a specific method of generating a feature master indicating a sign of a fault is described. It is preferable that fault data (for example, a DTC (Diagnostic Trouble Code)) obtained from the vehicle when a vehicle fault occurs, and observation data observed by each device in the vehicle in time series up to immediately before the fault occurs are used to generate a feature master indicating a sign of a fault. This is because data up to immediately before the fault occurs is considered to include features indicating the sign of the fault.

Therefore, a feature master may be generated in which the content of the fault indicated by the fault data and the feature extracted from the corresponding observation data are associated with each other. In this case, for example, a feature master may be generated by extracting a part having common features from multiple observation data regarding the same fault content that have been collected.

In generating the above feature master, the so-called model-free analysis described in the non-patent literature 1 may be performed on the observation data obtained in a time series. Model-free analysis is a technique for matching the similarity between the present and the past for observation data such as sensor values that are obtained in a time series, and is a technique for determining when the present condition is similar to a past condition.

Specifically, the observation data obtained in time series may be used as learning data for deep learning to learn a feature extraction engine for the system, and features may be extracted from the observation data using the learned feature extraction engine.

It is preferable that a feature master be prepared for each type of vehicle (vehicle type). This is because, for example, the signs indicating normal conditions or faults may differ for each vehicle type.

The comparison unit 40 compares the content of the normal pattern file with the content of the observation data collected by the collection unit 30 and determines that there is a possibility of a vehicle fault if those contents match. The match here includes not only the case where the contents completely match, but also the case where the difference between the two contents is within a predetermined range (hereinafter, referred to as a first threshold value). The first threshold value is predetermined by the user or others according to the content of the observation data to be compared.

For example, when the normal pattern file includes features indicating the normal condition (i.e., it is a feature master), the comparison unit 40 may determine the similarity between the features of the observation data included in the feature master and the features of the observation data obtained by the own vehicle, and detect the possibility of the vehicle fault. Specifically, the comparison unit 40 may compare the observation data obtained under the same environmental conditions as the environmental conditions under which the observation data that was the basis for generating the feature master was obtained with the feature master, and determine that there is a possibility of a vehicle fault when observation data indicating a feature that is not similar to the feature included in the feature master is found.

For example, when a feature master is generated based on the observation data obtained when the speed is 0 as an environmental condition, the comparison unit 40 compares the feature master with the observation data obtained when the speed is 0. Then, when observation data indicating a feature that is not similar to the feature included in the feature master is found, the comparison unit 40 may determine that there is a possibility of a vehicle fault. The method by which the comparison unit 40 extracts a feature from the observation data is the same as the method used to extract features from the observation data when generating the feature master.

If the content of the normal pattern file and the content of the observation data obtained by the own vehicle match, or if the difference between the two contents is within a predetermined threshold value, the comparison unit 40 may determine that the vehicle is in a normal condition.

When it is determined that there is a possibility of vehicle fault, the comparison unit 40 further compares the content of the fault pattern file with the content of the observation data collected by the collection unit 30, and determines that there is a sign of a vehicle fault if those contents match. The match here also includes not only the case where the contents completely match, but also the case where the difference between the two contents is within a predetermined range (hereinafter, referred to as a second threshold value). The second threshold value is also predetermined by the user or others according to the content of the observation data to be compared.

For example, when the fault pattern file includes features indicating a sign of a fault (i.e., it is a feature master), the comparison unit 40 may determine the similarity between the features of the observation data included in the feature master and the features of the observation data obtained by the own vehicle, and detect the sign of the vehicle fault. Specifically, the comparison unit 40 may compare the observation data collected by the collection unit 30 with the feature master, and determine that there is a sign of a vehicle fault when a feature similar to the features indicated by the observation data is found in the feature master.

Thus, in this exemplary embodiment, if the comparison unit 40 determines that there is a possibility of a vehicle fault when the content of the normal pattern file and the content of the observation data do not match. Then, the comparison unit 40 further determines that there is a sign of a vehicle fault when the content of the fault pattern file and the content of the observation data match.

In other words, the comparison unit 40 determines the possibility of a fault from the observation data using the normal pattern file, and further determines the sign of a fault from the observation data using the fault pattern file. Therefore, it is possible to suppress false detections that may occur frequently only by comparing with the normal pattern file by comparing with the fault pattern file. Thus, it is possible to improve the accuracy of detecting a sign of a vehicle fault.

Figure 2:
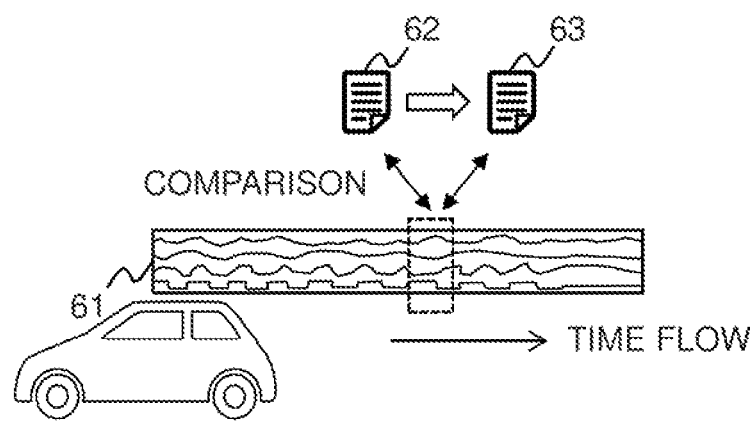
FIG. 2 It depicts an explanatory diagram showing an example of a process for detecting a sign of a fault.

FIG. 2 is an explanatory diagram showing an example of a process for detecting a sign of a fault. After the collection unit 30 collects CAN/OBD data as the observation data 61 of the vehicle, the comparison unit 40 first compares the content of the normal pattern file 62 with the content of the observation data 61. When the content of the normal pattern file 62 and the content of the observation data 61 do not match, the comparison unit 40 further compares the content of the fault pattern file 63 with the content of the observation data 61. When the content of the fault pattern file 63 and the content of the observation data 61 match, the comparison unit 40 determines that there is a sign of a vehicle fault.

The output unit 50 outputs the determination result by comparison unit 40.

The input unit 20, the collection unit 30, the comparison unit 40, and the output unit 50 are realized by a processor (for example, CPU (Central Processing Unit), GPU (Graphics Processing Unit)) of a computer that operates according to a program (a fault sign detection program). For example, a program may be stored in the storage unit 10, and the processor may read the program and operate as the input unit 20, the collection unit 30, the comparison unit 40, and the output unit 50 according to the program. In addition, the functions of the fault sign detection device 100 may be provided in the form of SaaS (Software as a Service).

The input unit 20, the collection unit 30, the comparison unit 40, and the output unit 50 may each be realized by dedicated hardware. Some or all of the components of each device may be realized by general-purpose or dedicated circuit, a processor, or combinations thereof. These may be configured by a single chip or by multiple chips connected through a bus. Some or all of the components of each device may be realized by a combination of the above-mentioned circuit, etc., and a program.

When some or all of the components of the fault sign detection device 100 are realized by multiple information processing devices, circuits, etc., the multiple information processing devices, circuits, etc. may be centrally located or distributed. For example, the information processing devices, circuits, etc. may be realized as a client-server system, a cloud computing system, etc., each of which is connected through a communication network.

Figure 3:
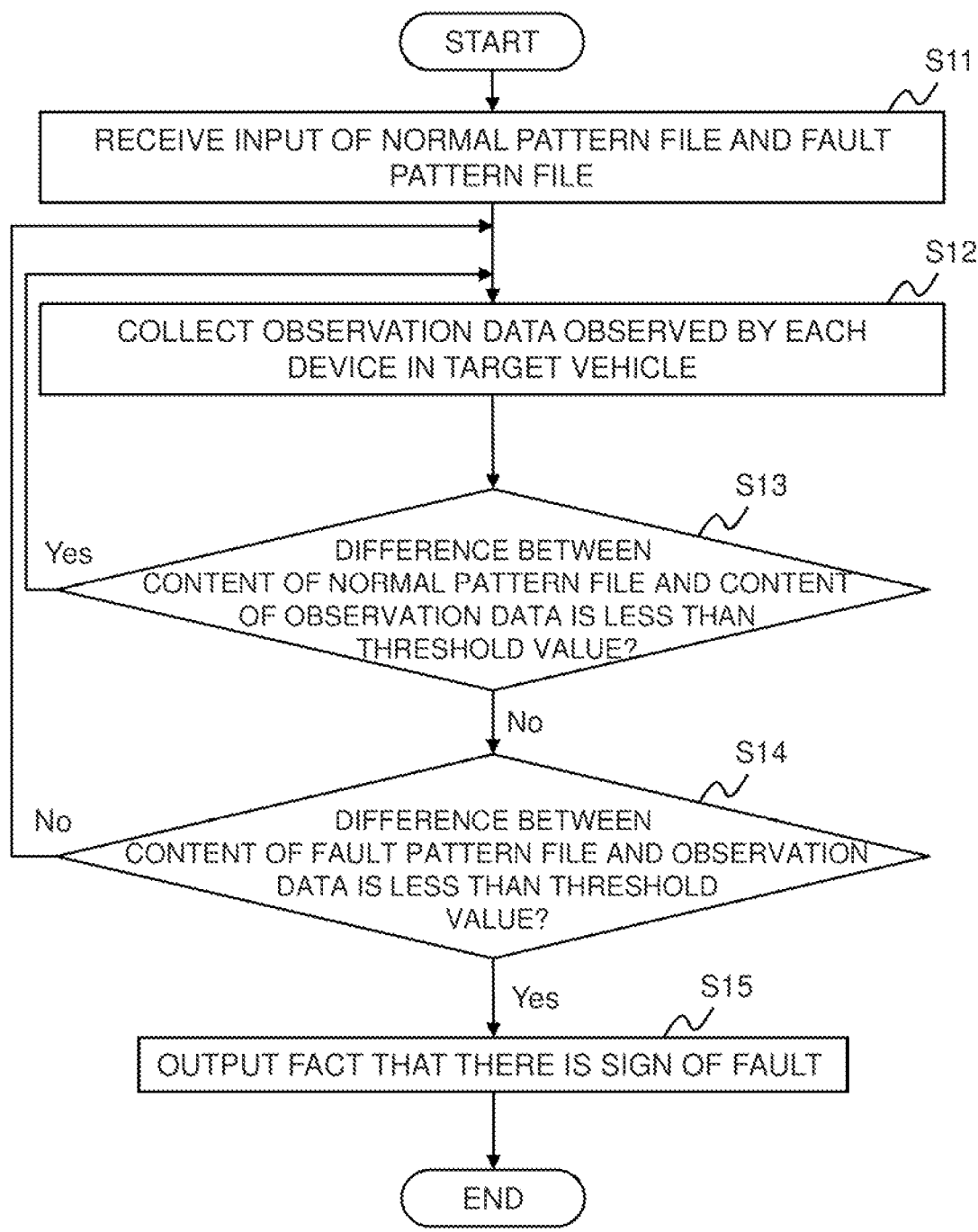
FIG. 3 It depicts a flowchart showing an operation example of a fault sign detection device.

Next, the operation example of this exemplary embodiment will be described. FIG. 3 is a flowchart showing an operation example of the fault sign detection device 100 of this exemplary embodiment.

The input unit 20 receives input of a normal pattern file and a fault pattern file (step S11). The collection unit 30 collects observation data observed by each device in a target vehicle (step S12). The comparison unit 40 compares the content of the normal pattern file with the content of the observation data (step S13). If the difference between the content of the normal pattern file and the content of the observation data is less than a threshold value (Yes in step S13), the comparison unit 40 determines that there are no signs of fault in the target vehicle and then the processing after step S12 is repeated.

On the other hand, if the difference between the content of the normal pattern file and the content of the observation data is not less than the threshold value (No in step S13), the comparison unit 40 further compares the content of the fault pattern file with the content of the observation data (step S14). If the difference between the content of the fault pattern file and the observation data is not less than a threshold value (No in step S14), the comparison unit 40 determines that there are no signs of fault in the target vehicle and then the processing after step S12 is repeated. On the other hand, if the difference between the content of the fault pattern file and the content of the observation data is less than the threshold value (Yes in step S14), the comparison unit 40 determines that there is a sign of a fault in the target vehicle, and the output unit 50 outputs the fact that there is a sign of a fault (step S15).

As described above, in this exemplary embodiment, the input unit 20 receives input of a normal pattern file and a fault pattern file, and the collection unit 30 collects observation data observed by each device in a target vehicle. Then, the comparison unit 40 compares the content of the normal pattern file with the content of the observation data, and when the difference between the two is greater than a first threshold value, further compares the content of the fault pattern file with the content of the observation data. when the difference between the two is within the second threshold value, the comparison unit 40 determines that there is the sign of the fault in the target vehicle. With such a configuration, it is possible to improve the accuracy of detecting a sign of a vehicle fault.

Exemplary Embodiment 2

Next, a second exemplary embodiment of the present invention will be described. The second exemplary embodiment describes a method in which a normal pattern file and a fault pattern file generated by a server are transmitted to a fault sign detection device in a target vehicle, and a fault is detected based on the transmitted pattern files.

Figure 4:
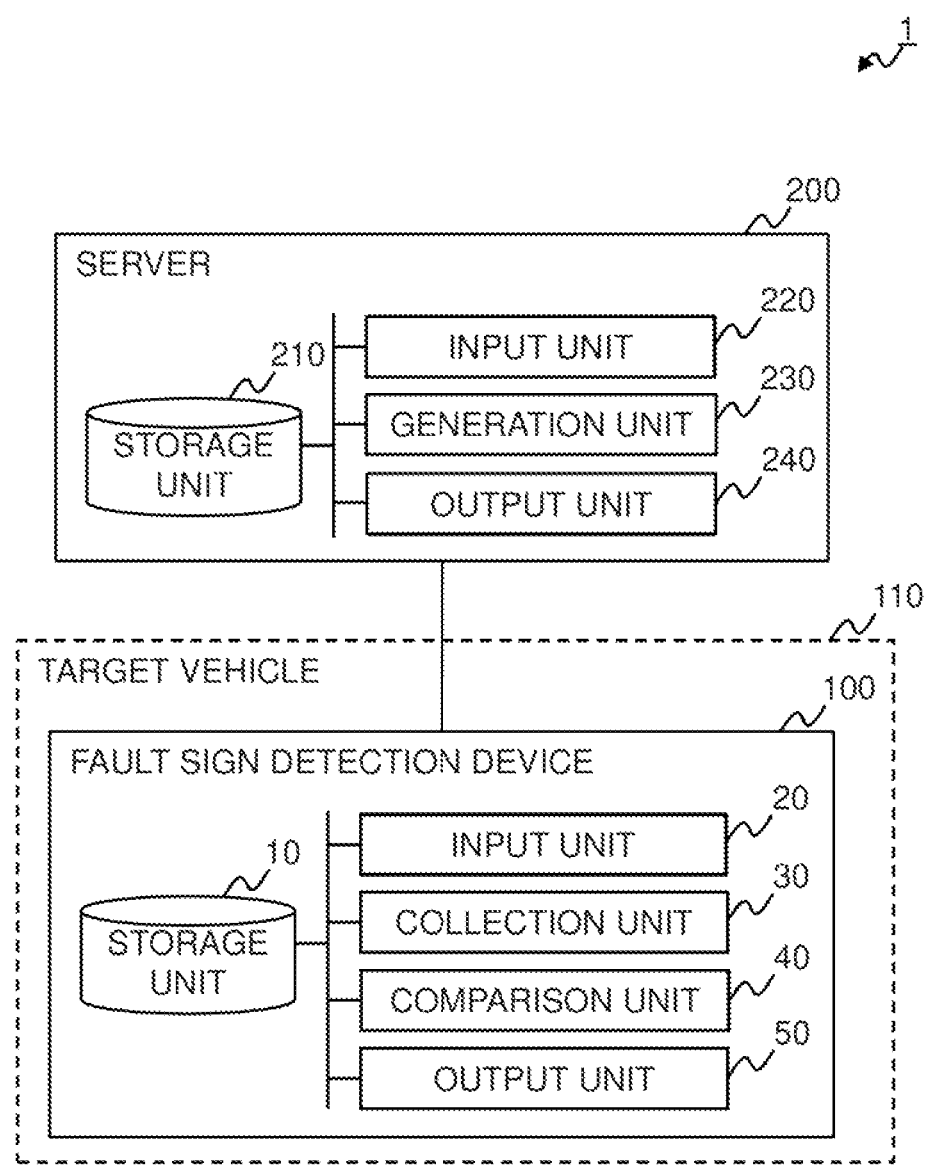
FIG. 4 It depicts a block diagram showing a configuration example of an exemplary embodiment of a fault sign detection system according to the exemplary aspect of the present invention.

FIG. 4 is a block diagram showing a configuration example of an exemplary embodiment of a fault sign detection system according to the exemplary aspect of the present invention. The fault sign detection system 1 in this exemplary embodiment comprises a fault sign detection device 100 and a server 200. The fault sign detection device 100 of this exemplary embodiment is similar to the fault sign detection device 100 of the first exemplary embodiment, so the description is omitted.

The server 200 and the fault sign detection device 100 are interconnected via communication lines. In the example shown in FIG. 4, the fault sign detection device 100 is mounted on a target vehicle 110. The number of target vehicles 110 is not limited to one, but may be two or more.

The server 200 is a device generating the normal pattern file and the fault pattern file (i.e., feature masters) shown in the first exemplary embodiment. The server 200 comprises a storage unit 210, an input unit 220, a generation unit 230, and an output unit 240.

The storage unit 210 stores various information necessary for the server 200 to perform a process. The storage unit 210 may also store observation data received by the input unit 220, which is described below. The storage unit 210 is realized, for example, by a magnetic disk, or the like.

The input unit 220 receives input of observation data observed in time series by each device in the vehicle. Specifically, the input unit 220 may receive input of observation data of a vehicle operating at a predetermined speed as the first observation data for generating a normal pattern file. The input unit 220 may also receive, as the second observation data for generating a fault pattern file, input of the fault data obtained from the vehicle when a fault of the vehicle occurs, and the observation data observed by each device in the vehicle in time series up to immediately before the fault occurs.

The observation data received by the input unit 220 is not limited to the observation data observed by the target vehicle 110, and may be observation data observed by another vehicle (not shown in FIG. 4). Thus, by receiving observation data from multiple vehicles, it is possible to generate a pattern file based on many observation data.

The generation unit 230 extracts time series features of the observation data and generating the normal pattern file and the fault pattern file based on the extracted feature. Specifically, the generation unit 230 extracts time series features of the first input observation data as features indicating normal conditions. Then, the generation unit 230 generates a feature master indicating the normal condition of the vehicle based on the extracted features as a normal pattern file. For example, if the input unit 220 receives an input of observation data of a vehicle operating at speed 0, the generation unit 230 may extract time series features of the observation data as features that indicate the normal condition of the vehicle while idling.

In addition, the generation unit 230 generates a feature master in which the content of the fault indicated by the fault data and the feature extracted from the corresponding observation data are associated with each other, as a fault pattern file.

Considering that the feature master is used for comparison with the observation data obtained by the vehicle, as shown in the first exemplary embodiment, it is preferable to be able to extract features of the observation data in a compact form. Therefore, the generation unit 230 may generate observation data of a partial time series by dividing the observation data of a time series into multiple segments, extract common features for each segment, and generate a feature master that includes those features.

The output unit 240 transmits the normal pattern file and the fault pattern file (i.e., feature masters) generated by the generation unit 230 to the fault sign detection device 100.

The input unit 220, the generation unit 230, and the output unit 240 are realized by a processor of a computer that operates according to a program (feature master generation program).

As described above, in addition to the configuration of the first exemplary embodiment, in this exemplary embodiment, the input unit 220 of the server 200 input of observation data observed in time series by each device in the vehicle. Then, the generation unit 230 generates, a feature master in which the content of the fault indicated by the fault data and the feature extracted from the corresponding observation data are associated with each other, as a fault pattern file, and generates a feature master that includes features of observation data of a vehicle operating at a predetermined speed as features indicating a normal condition, as a normal pattern file. Therefore, in addition to the effects of the first exemplary embodiment, it is possible to use pattern files generated based on a large number of observation data for fault detection.

Figure 5:
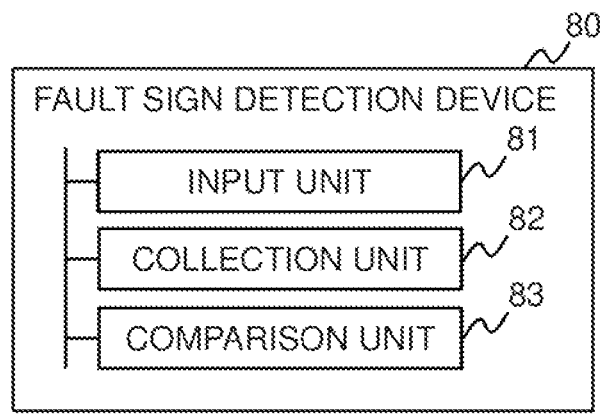
FIG. 5 It depicts a block diagram showing an overview of a fault sign detection device according to the exemplary aspect of the present invention.

Next, an overview of the present invention will be described. FIG. 5 is a block diagram showing an overview of a fault sign detection device according to the exemplary aspect of the present invention. The fault sign detection device 80 according to the exemplary aspect of the present invention is a fault sign detection device (for example, the fault sign detection device 100) for detecting a sign of a fault of a target vehicle, comprises an input unit 81 (for example, the input unit 20) which receives input of a normal pattern file including information indicating a normal condition of a vehicle, and a fault pattern file including information indicating a sign that a vehicle fault is about to occur, a collection unit 82 (for example, the collection unit 30) which collects observation data observed by each device in the target vehicle, and comparison unit 83 (for example, the comparison unit 40) which compares the content of the normal pattern file with the content of the observation data, wherein when the difference between the content of the normal pattern file and the content of the observation data is greater than a predetermined first threshold value, the comparison means further compares the content of the fault pattern file and the observation data, and when the difference between the content of the fault pattern file and the observation data is within a predetermined second threshold value, determines that there is the sign of the fault in the target vehicle.

when the difference between the content of the normal pattern file and the content of the observation data is greater than a predetermined first threshold value, the comparison unit 83 further compares the content of the fault pattern file and the observation data, and when the difference between the content of the fault pattern file and the observation data is within a predetermined second threshold value, determines that there is the sign of the fault in the target vehicle.

With such a configuration, it is possible to improve the accuracy of detecting a sign of a vehicle fault.

The input unit 81 may also receive input of the normal pattern file that includes a feature extracted in time series from the observation data of the vehicle operating at a predetermined speed as the feature indicating the normal condition. The collection unit 82 may then collect the observation data observed at the predetermined speed, and the comparison unit 83 may compare the observation data with the content of the normal pattern file.

Specifically, the input unit 81 may receive input of the normal pattern file that includes a feature extracted in time series from the observation data of the vehicle operating at a speed of 0 as the feature indicating the normal condition. The collection unit 82 may then collect the observation data collected during idling, and the comparison unit 83 may compare the observation data with the content of the normal pattern file.

The input unit 81 may also receive input of a normal pattern file, in which time-series observation data is divided into multiple segments, and which includes features of the observation data extracted for each segment. The comparison unit 83 may then compare the feature included in the normal pattern file with the feature of the collected observation data.

Similarly, the input unit 81 may receive input of a fault pattern file, in which time-series observation data is divided into multiple segments, and which includes features of the observation data extracted for each segment. The comparison unit 83 may then compare the feature included in the fault pattern file with the feature of the collected observation data.

Figure 6:
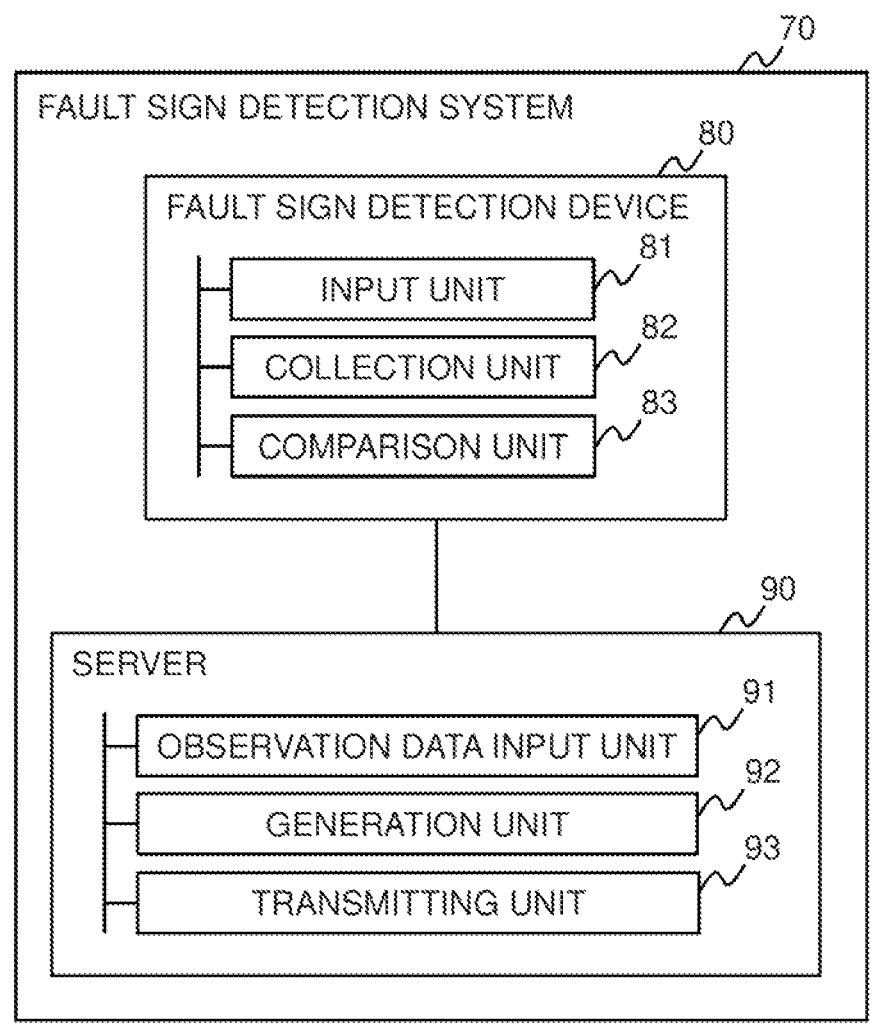
FIG. 6 It depicts a block diagram showing an overview of a fault sign detection system according to the exemplary aspect of the present invention.

FIG. 6 is a block diagram showing an overview of a fault sign detection system according to the exemplary aspect of the present invention. The fault sign detection system 70 (for example, the fault sign detection system 1) according to the exemplary aspect of the present invention comprises the above-mentioned fault sign detection device 80, and a server 90 (for example, the server 200) which generates a normal pattern file and a fault pattern file.

The server 90 includes an observation data input unit 91 (for example, the input unit 220) which receives input of observation data, a generation unit 92 (for example, the generation unit 230) which extracts time series features of the observation data and generating the normal pattern file and the fault pattern file based on the extracted feature, and a transmitting unit 93 (for example, the output unit 240) which transmits the generated normal pattern file and fault pattern file to the fault sign detection device.

Even with such a configuration, it is possible to improve the accuracy of detecting a sign of a vehicle fault, and furthermore, to use pattern files generated based on a large number of observation data for detection of a sign of a fault.

Although the present invention has been described with reference to the foregoing exemplary embodiments and examples, the present invention is not limited to the foregoing exemplary embodiments and examples. Various changes understandable by those skilled in the art can be made to the structures and details of the present invention within the scope of the present invention.

REFERENCE SIGNS LIST

1 Fault sign detection system
10 Storage unit
20 Input unit
30 Collection unit
40 Comparison unit
50 Output unit
100 Fault sign detection device
110 Target vehicle
200 Server
210 Storage unit
220 Input unit
230 Generation unit
240 Output unit

What is claimed is:

1. A fault sign detection device for detecting a sign of a fault of a target vehicle, comprising:
   a memory storing instructions; and
   one or more processors configured to execute the instructions to:
   receive input of a normal pattern file and a fault pattern file, the normal pattern file including information indicating a normal condition of a vehicle, and the fault pattern file including information indicating a sign that a vehicle fault is about to occur;
   collect observation data observed by each device in the target vehicle; and
   compare the content of the normal pattern file with the content of the observation data;
   in a case that the difference between the content of the normal pattern file and the content of the observation data is greater than a predetermined first threshold value, further compares the content of the fault pattern file and the observation data; and
   in a case that the difference between the content of the fault pattern file and the observation data is within a predetermined second threshold value, determine that there is the sign of the fault in the target vehicle.

2. The fault sign detection device according to claim 1, wherein the processor is further configured to execute instructions to:
   receive input of the normal pattern file including a feature indicating the normal condition, the feature being extracted in time series from the observation data of the vehicle operating at a predetermined speed;
   collect the observation data observed at the predetermined speed; and
   compare the observation data with the content of the normal pattern file.

3. The fault sign detection device according to claim 1, wherein the processor is further configured to execute instructions to:
   receive input of the normal pattern file including a feature indicating the normal condition, the feature being extracted in time series from the observation data of the vehicle operating at a speed of 0;
   collect the observation data collected during idling; and
   compare the observation data with the content of the normal pattern file.

4. The fault sign detection device according to claim 1, wherein the processor is further configured to execute instructions to:
   receive input of a normal pattern file, the normal pattern file including time-series observation data in the form of multiple segments and including features of the observation data extracted for each segment; and
   compare the feature included in the normal pattern file with the feature of the collected observation data.

5. The fault sign detection device according to claim 1, wherein the processor is further configured to execute instructions to:
- receive input of a fault pattern file, the fault pattern file including time-series observation data in the form of multiple segments, and including features of the observation data extracted for each segment; and
- compare the feature included in the fault pattern file with the feature of the collected observation data.

6. A fault sign detection system comprising:
the fault sign detection device of claim 1; and
a server which generates a normal pattern file and a fault pattern file, wherein the server includes:
- an observation data receiver for receiving input of observation data;
- a generator for extracting time series features of the observation data and generating the normal pattern file and the fault pattern file based on the extracted feature; and
- a transmitter for transmitting the generated normal pattern file and fault pattern file to the fault sign detection device.

7. A fault sign detection method for detecting a sign of a fault of a target vehicle, comprising:
- receiving input of a normal pattern file and a fault pattern file, the normal pattern file including information indicating a normal condition of a vehicle, and the fault pattern file including information indicating a sign that a vehicle fault is about to occur;
- collecting observation data observed by each device in the target vehicle;
- comparing the content of the normal pattern file with the content of the observation data;
- in a case that the difference between the content of the normal pattern file and the content of the observation data is greater than a predetermined first threshold value, comparing the content of the fault pattern file and the observation data; and
- in a case that the difference between the content of the fault pattern file and the observation data is within a predetermined second threshold value, determining that there is the sign of the fault in the target vehicle.

8. The fault sign detection method according to claim 7, further comprising:
- receiving input of the normal pattern file including a feature indicating the normal condition, the feature being extracted in time series from the observation data of the vehicle operating at a predetermined speed;
- collecting the observation data observed at the predetermined speed; and
- comparing the observation data with the content of the normal pattern file.

9. A non-transitory computer readable information recording medium storing a fault sign detection program which is installed in a computer for detecting a sign of a fault of a target vehicle, when executed by a processor, the fault sign detection program performs a method for:
- receiving input of a normal pattern file and a fault pattern file, the normal pattern file including information indicating a normal condition of a vehicle, and the fault pattern file including information indicating a sign that a vehicle fault is about to occur;
- collecting observation data observed by each device in the target vehicle; and
- comparing the content of the normal pattern file with the content of the observation data;
- in a case that the difference between the content of the normal pattern file and the content of the observation data is greater than a predetermined first threshold value, further comparing the content of the fault pattern file and the observation data; and
- in a case that the difference between the content of the fault pattern file and the observation data is within a predetermined second threshold value, determining that there is the sign of the fault in the target vehicle, in the comparison process.

10. The non-transitory computer readable information recording medium according to claim 9, further comprising:
- receiving input of the normal pattern file including a feature indicating the normal condition, the feature being extracted in time series from the observation data of the vehicle operating at a predetermined speed;
- collecting the observation data observed at the predetermined speed; and
- comparing the observation data with the content of the normal pattern file.

* * * * *